United States Patent [19]

Watts et al.

[11] 4,230,607

[45] Oct. 28, 1980

[54] FASTER PROCESSING VINYL COMPOSITIONS

[75] Inventors: William A. Watts, Uniontown; Mark D. Creekmore, Akron, both of Ohio

[73] Assignee: The Goodyear Tire & Rubber Company, Akron, Ohio

[21] Appl. No.: 869,878

[22] Filed: Jan. 16, 1978

[51] Int. Cl.[3] .......................... C08K 5/06; C08K 5/10

[52] U.S. Cl. .......................... 260/23 XA; 260/23 R; 260/23 EP; 260/23 H; 260/31.6

[58] Field of Search ............ 260/23 XA, 23 R, 23 H, 260/31.6, 23 EP

[56] References Cited

U.S. PATENT DOCUMENTS

| | | | |
|---|---|---|---|
| 3,929,699 | 12/1975 | Bernholz | 260/23 XA |
| 3,950,289 | 4/1976 | D'Amato et al. | 260/23 XA |
| 4,057,672 | 11/1977 | Creekmore et al. | 260/23 XA |
| 4,072,790 | 2/1978 | Creekmore et al. | 260/23 XA |

*Primary Examiner*—Joseph L. Schofer
*Assistant Examiner*—Herbert J. Lilling
*Attorney, Agent, or Firm*—J. D. Wolfe

[57] ABSTRACT

A vinyl resin composition is obtained by mixing the vinyl resin with plasticizer in combination with three surfactants, namely, a partial aliphatic glycerine ester, a partial aliphatic ester of sorbitan and a polyalkoxylated alkyl phenol to produce a composition which has excellent antifogging and antiblocking properties and is more readily sheeted in the film than compositions without these three surfactants.

1 Claim, No Drawings

FASTER PROCESSING VINYL COMPOSITIONS

This invention relates to the production of faster processing vinyl compositions that produce films having improved antifogging and antiblocking properties.

Polymer films or sheets are widely used to package food products because of their ease of handling, inherent viewability and elimination of the sanitary problem. Some examples of such films include cellophane, rubber hydrochloride, polypropylene, polyvinyl chloride and various interpolymers and mixtures of polymers of vinyl halides, acetates and alcohols. When polymeric films are used to package food products, and particularly fresh meat products, and the packages are subsequently stored for display in refrigerated units, certain disadvantages become evident. Within temperature ranges normally found in such refrigeration units, about 25° F. to 40° F., the depressed vapor pressure of water results in precipitation of fine droplets of moisture on the surfaces of the film. Often, within an hour after being packaged and stored, sufficient water evaporates from the meat surface to saturate the air spaces between the film and the meat, and then begins to condense on the inner surfaces of the film as minute droplets of water. As more water droplets form on the inner surfaces, an overall fogged effect is produced, interfering with visual identification of the meat or other packaged commodity. The term "fog" is in fact commonly used to describe this occurrence. The presence of fog is particularly objectionable from the point of view of selling the products as it effectively bars the potential customer's view of the item which he seeks to purchase.

An additional requirement of the wrapper film when the food on display is a red meat item such as beef, that it be sufficiently permeable to oxygen as to allow oxidation of the hemoglobins in the blood of fresh red meat in order to have the meat retain its red surface color. The red color is usually required to last up to 3 days at refrigeration temperatures. Insufficient oxygen permeability results in a rapid and undesirable darkening of the meat. However, other food stuffs require less oxygen permeability typically poultry, which does not have the hemoglobin content of red meat, requires less oxygen permeability. Lettuce and other produce require minimal or no oxygen permeability to maintain freshness. The antifogging compositions of this invention can be used for vinyl films intended for the protection of any and all types of foodstuffs.

U.S. Pat. No. 3,929,699 uses a combination of two treating agents, hereinafter referred to as treating agent A and treating agent B, where treating agent A is a partial ester of a water soluble polyol containing 2 to 6 carbon atoms esterified with an aliphatic monocarboxylic acid of 8 to 20 carbon atoms and treating agent B is an alkoxylated alkyl phenol as antifogging and antiblocking agents for vinyl films. Likewise, U.S. Pat. No. 3,950,289 teaches the use in combination of treating agents A and B but U.S. Pat. No. 3,479,308 teaches treating agent A combined with polyoxylated sorbitan monooleate. Thus, the prior art has taught two treating agents of various types can be used to solve the antifogging and antiblocking problem.

Unexpectedly, applicants have discovered that the use of a combination of three treating agents, i.e. A plus B plus C without regard to sequence of addition produces a vinyl composition that can be sheeted in to a film and the film be wound upon a roll at rates in excess of those obtained with two component treatments of the patents cited above.

The present invention is a polymeric vinyl composition and the film made therefrom contains in combination three treating agents to produce antifogging, lubricating and antiblocking properties; said composition may include other components such as plasticizers, stabilizers, color additives, or other materials well known in the art of "compounded vinyl food films."

The antifogging, lubricating and antiblock system is comprised of the following combination of treating agents:

(A) a partial ester of glycerine and an aliphatic, saturated or unsaturated, monocarboxylic acid containing 8 to 18 carbon atoms;

(B) a polyethoxylated alkyl phenol, where the alkyl group contains 8–12 carbons, with an average of 8 to 20 moles of ethylene oxide; and (C) a partial ester of sorbitan and a $C_8$ to $C_{18}$ aliphatic, saturated or unsaturated, monocarboxylic acid.

Representative members of each of these treating agents are listed in the above patents. Partial ester A is a partial ester of glycerine, wherein a minimum of one (on the average ) of the hydroxyl groups is not reacted with the acid to form the ester and at least one of the hydroxyl groups is reacted with the acid to form the ester. The acid component of the ester may be any aliphatic, saturated or unsaturated, monocarboxylic acid containing 8 to 18 carbon atoms, examples of which are caprylic, capric, lauric, palmitic, oleic, stearic, and like acids.

Component B is a polyethoxylated alkyl phenol produced by the condensation of one mole of alkyl phenol, where the alkyl group has 8 to 12 carbons (examples of which are octyl, nonyl, decyl, undecyl, dodecyl), with an average of 8 to 20 moles of ethylene oxide. The phenol can be substituted in one or more positions with the alkyl groups in the ortho, meta, or para positions. Examples of these polyalkoxylated alkyl phenols include alpha-(p-nonylphenyl)-omega-hydroxypoly(oxyethylene), alpha-(p-octylphenyl)-omega-hydroxypoly (oxyethylene), and the like.

Partial ester C is a partial ester of sorbitan, wherein a minimum of one (on the average) of the hydroxyl groups is not reacted with the acid to form the ester and at least one of the hydroxyl groups is reacted with the acid to form the ester. The acid component of the ester may be any aliphatic, saturated or unsaturated, monocarboxylic acid containing 8 to 18 carbon atoms, examples of which are caprylic, capric, lauric, palmitic, oleic, stearic, and like acids.

The nature of this invention is illustrated by the following examples and recipes wherein all parts are parts by weight:

| Ingredients | Range |
|---|---|
| PVC Resin | 100.00 |
| Treating Agent A | 0.5–5.0 |
| Treating Agent B | 0.5–5.0 |
| Treating Agent C | 0.5–5.0 |
| Plasticizer | 10–80 |

The ingredients above are processed on a mill in the customary manner and the resulting vinyl composition with or without solvent is used to make a film by either extrusion or casting from the usual solvents. it was found that the three-component treated vinyl composition could be stripped from the casting belt at lower force and the film could be produced and rolled onto a roll at a faster rate.

These benefits and advantages are illustrated in results of Table I where vinyl resin has been compounded in the usual manner, with two and three treating agents respectively and then sheeted into a film on a belt having a polyvinyl alcohol coating to facilitate release of film from the belt. The plasticizer used in these examples was a blend of about 80-90 dioctyl adipate and the remainder is epoxized soybean oil.

TABLE I

PROPERTIES OF TWO AND THREE COMPONENT TREATED VINYL COMPOSITIONS

| Ingredients and Properties | Recipe 1 | Recipe 2 | Recipe 3 | Recipe 4 |
|---|---|---|---|---|
| Resin, phr | 100 | 100 | 100 | 100 |
| Plasticizer, phr | 36 | 36 | 34 | 34 |
| Stabilizer | 0.5 | 0.5 | 0.5 | 0.5 |
| Proprietary Surfactants | 5.73* | | 6.75** | |
| Igepal-CO-720[1] | | 1.6 | | 1.6 |
| Span 80[2] | | 1.3 | | 1.3 |
| Atmos 300[3] | | 1.3 | | 1.3 |
| Moisture Antifog Properties: | | | | |
| Test No. 1[4] | | | | |
| (Time to Clear in Minutes) | 0 | 0 | 0 | 0 |
| Test No. 2[5] | | | | |
| (Time to Clear in Minutes) | 0 | 0 | 0 | 0 |
| Condensation | None | None | None | None |
| Stripping Force[6] | | | | |
| (in grams) | 60 | 50 | 72 | 50 |
| Bloom, after 47 days | None | None | None | None |
| Projected Improvement | 0% | 16.6% | 0% | 30.5% |

[1]Igepal CO-720 is the tradename for (p-nonylphenyl) omega-hydroxypoly (oxyethylene) (12 moles of ethylene oxide).
[2]Span 80 is the tradename for sorbitan monooleate.
[3]Atmos 300 is the tradename for mono and diglycerides of fat forming acids.
[4]Antifog Test No. 1 - hot water beaker test.
[5]Antifog Test No. 2 - cold box test.
[6]Stripping force (grams) required to remove a 3" wide film from a polyvinyl acetate coating after 5 minutes at 120° F.
*This proprietary surfactant was a blend of 2.38 parts mon-diglyceride of fatty acids, 1.35 parts polyoxyethylene solution monooleate and 1.50 parts p-nonylphenyl omega-hydroxy polyoxyethylene (E.O.-5 moles).
**Designates a proprietary surfactant that contains 1.50 parts mono-diglyceride of fatty acids and 5.25 parts of p-nonyl-phenyl omega-hydroxy polyoxyethylene (E.O.-4.2 moles).

It is amazing and unexpected to learn that recipes 2 and 4 give a vinyl composition that can be processed so much faster than the composition of recipe 1 and 3.

The nature of the vinyl resin and plasticizer are well known and excellently exemplified in patents referred to hereinabove.

While certain representative embodiments and details have been shown for the purpose of illustrating the invention, it will be apparent to those skilled in this art that various changes and modifications may be made therein without departing from the spirit or scope of the invention.

What is claimed is:

1. A vinyl resin composition containing 100 parts of vinyl resin, 10 to 80 parts of plasticizer and in combination 0.5 to 50 parts of a partial ester of glycerine and an aliphatic, saturated or unsaturated, monocarboxylic acid containing 8 to 18 carbon atoms, 0.5 to 50 parts of a partial ester of sorbitan and an aliphatic, saturated or unsaturated, monocarboxylic acid containing 8 to 18 carbon atoms and 0.5 to 50 parts of a polyethoxylated alkyl phenol, where the alkyl group contains 8-12 carbons, with an average of 4-20 moles of ethylene oxide.

* * * * *